US006276304B1

(12) United States Patent
Tai

(10) Patent No.: US 6,276,304 B1
(45) Date of Patent: Aug. 21, 2001

(54) OZONE INJECTION SYSTEM

(76) Inventor: Paul Ling Tai, 421 Glazier Rd., Chelsea, MI (US) 48118

( * ) Notice: Subject to any disclaimer, the term of this patent is extended or adjusted under 35 U.S.C. 154(b) by 0 days.

(21) Appl. No.: 09/285,568

(22) Filed: Apr. 2, 1999

Related U.S. Application Data

(63) Continuation-in-part of application No. 09/170,445, filed on Oct. 13, 1998, now Pat. No. 5,983,834.

(51) Int. Cl.$^7$ .............................. A01K 1/00; B01J 19/08
(52) U.S. Cl. ...................................... 119/448; 422/186.07
(58) Field of Search .................... 119/448, 447, 119/416, 418, 420; 422/5, 186.07

(56) References Cited

U.S. PATENT DOCUMENTS

| | | | |
|---|---|---|---|
| 3,884,804 | * 5/1975 | Robinson et al. | 210/763 |
| 3,918,404 | * 11/1975 | Bunger | 119/450 |
| 3,982,499 | * 9/1976 | Frankl | 119/450 |
| 5,501,844 | * 3/1996 | Kasting, Jr. et al. | 422/186.15 |
| 5,514,346 | * 5/1996 | Fujita | 2/121 |
| 5,624,635 | * 4/1997 | Pryor | 422/32 |
| 5,788,930 | * 8/1998 | McMurray | 422/121 |
| 5,983,834 | * 11/1999 | Tai | 119/448 |

* cited by examiner

Primary Examiner—Peter M. Poon
Assistant Examiner—Yvonne R. Abbott
(74) Attorney, Agent, or Firm—Lyon P.C.

(57) ABSTRACT

A method and system for ozone injection into a confined area is described. Ozone is homogeneously transferred throughout the air in the building at levels considered safe by OSHA. Ozone thus affects a reduction in odor, dust, flies, and relative humidity, thereby inhibiting primary disease-causing vectors. At steady state, a system and method of two-tier ozonation can generically be described as hyper-ozonation of air recirculated from a confined area into a plenum or chamber void of animals or humans. The hyper-ozonated air is then pumped back to the confined area wherein the ozone concentration is maintained at 0.1 PPM or less.

16 Claims, 4 Drawing Sheets

OZONE INJECTION SYSTEM

CROSS-REFERENCE TO RELATED APPLICATIONS

This is a continuation-in-part of U.S. application Ser. No. 09/170,445 filed on Oct. 13, 1998 now U.S. Pat. No. 5,983,834.

TECHNICAL ART

The instant invention relates to a purification and odor-control system for livestock containment areas, and more generally, for any area requiring control of airborne pollutants.

BACKGROUND OF THE INVENTION

Economic and political pressures are now encouraging the development of pig and livestock farms, in lieu of tobacco farms for example. Recent developments however, have restricted the design of new or expanding pig farms. Concerns such as odor, air quality, and ground and surface water quality, often implicating the Clean Water Act and/or the Clean Air Act, drive the restrictions.

The number of animals housed in a barn, and the resultant manure, contribute to several odor and health related problems. Aside from the private and public nuisance concerns, acute odors also indicate the potential for disease and reduced hog propagation due to respiratory problems, for example. In humans, even lower concentrations (100–300 parts per billion) of gases such as hydrogen sulfide are known to cause eye irritation, headaches, diarrhea, nausea, and an inability to sleep. Many of the gases, bacteria, viruses, spores, and worms found in manure contribute to a number of illnesses that may inhibit the full maturation of the swine, result in condemnation of all or part of the pig, and/or result in their premature deaths. In addition, many pathogens harmful to animals may also be harmful to workers. The swine flu is illustrative. It is believed that insects and birds transfer these pathogens to the surrounding community.

In general, hog manure and urine contains or evolves into ammonia, hydrogen sulfide, methane, nitrates, trihalomethanes, spores of molds, and other contaminants. Research has shown that animal effluvia and the putrefactive gases resulting from animal and vegetable tissue are generally present in and around hog barns. Putrefaction produces highly odorous gases and compounds such as ammonia, amino acids, aromatic fatty acids, metabolites, mercaptans, indole, skatole, cresol, and alkaloid-like ptomaines such as tetramethylene-diamine and pentamethylene-diamine. Of course, the microbiological agents producing these gases are also present in and around barns.

In fact, one of the major concerns within the barn is the amount of dust caused by trampling of the feed and manure, and also from the dander of the animals. As the manure is trampled, it exudes through slots or grates in the concrete floor to a manure pit housed below the animal containment area. As the animals work the manure, odor-causing gases are also liberated. The dust is problematic in several ways. To begin with, particulate sizes of 0.7 to 1.5 microns readily settle within the alveoli of the lungs thereby causing respiratory ailments in pigs or other livestock. Airborne pathogens carried by the dust are thus transferred to the lungs of the livestock, thereby requiring antibiotic treatment. In fact, about 65% of animal diseases are caused due to dust. The same mechanism causes chronic obstructive pulmonary emphysema in humans, also known as "Farmer's Lung" or "Smoker's Lung".

Several methods have been developed to deal with these concerns. Filtration towers containing water and/or air-bio filters such as microfiltration sponges filter the barn air as it passes through. These systems are costly and labor intensive.

Another approach involves spraying oil on the floors and sides of the barn. As the oil accumulates, however, it becomes increasingly more difficult to move across the slippery surfaces of the barn. Furthermore, the oil may contribute to a structural breakdown of the barn.

Ventilation is another approach. In tunnel ventilation, the air within a building is completely replaced about every 30 seconds. In winter, however, this method is often cost prohibitive due to heat loss. In recirculation ventilation, half of the air is vented outside of the building and the other half is routed back into the barn. Again, this method also causes heat loss, but to a lesser extent. Additionally, the dust and odors are not completely removed. In general, the dust vented to the outside air has been found to travel anywhere from five to eight miles from the source, thereby causing epidemics and disease transfer from farm to farm or from farm to community. Recently, 200,000 animals were destroyed in a single province of Spain due to disease transferred by this mechanism. Taiwan destroyed their entire swine herd after an outbreak of hoof and mouth disease.

Finally, another approach to alleviating the dust is the spraying of probiotic nonpathogenic bacteria. The probiotic bacteria denitrify ammonia-causing gases and also bind to hydrogen sulfide thereby inhibiting odor. The method can be very costly because the temperature must be maintained at a constant temperature of 65–100 degrees Fahrenheit. Although characterized as nonpathogenic, if the probiotic bacteria are cross-contaminated by pseudomonas or *E-coli* for example, rampant disease can result. The method is also labor intensive given that the bacteria must be applied every day.

In addition to dust and odor, high humidity is also a concern in the barn. During the fall, winter, and spring, relative humidity levels of approximately 90% are not uncommon.

Recent attention has also focused on the need for environmental control in and around manure pits. Odors resulting from many manure pits and containment areas significantly detract from the use, enjoyment, and value of surrounding property. The formation of a manure crust in certain pits seals the containment area thereby preventing natural aeration and contributing to an unbalanced anaerobic state. This results in an acute and malodorous buildup of methane, hydrogen sulfide, and other gases. The formation of the crust also creates a breeding ground for flies, believed to be another primary disease vector from the farm to the surrounding community. Birds, in turn, often feed on the fly larvae and constitute a secondary disease vector. Finally, crust formation also inhibits slurry removal thereby contributing to an inoperable pit. The benefits of odor control and crust prevention thus become obvious.

A recent study by the U.S. Senate details the magnitude of environmental problems caused by animal waste. The findings indicate that the amount of animal manure produced annually is conservatively estimated to be 130 times greater than the amount of human waste produced. Stated another way, a 50,000-acre farm in Utah has been cited as potentially producing more waste than the entire city of Los Angeles. Other findings indicate that agricultural officials consider 60% of rivers and streams "impaired", with agricultural runoff the largest contributor to the pollution. Anecdotally, a 30,000 fish kill resulted from a weekend hog manure spill in Iowa. As such, efforts are underway to impose national standards on livestock producers. An improvement in the treatment of the manure is therefore needed.

On a state level, certain areas such as North Carolina have enacted moratoriums on new or expanding hog farms. North Carolina has also granted counties zoning control over farms with more than 5,000 hogs. Industry experts warn that as more restrictions are placed on U.S. hog farms, pork production could move to other countries thereby damaging family farms and sending food profits overseas. The net result of further restrictions limits the land use and therefore detracts from the profitability of the farmland.

Several methods of storage and/or disposal include aboveground slurry storage, belowground slurry storage, anaerobic pits with or without cover, aerated pits, oxidation ditches, and solid/liquid separation. Each method has its advantages and disadvantages such as costliness and ineffective odor control. To mitigate the odors, pit additives are often used with little to moderate success.

Scientists have attempted to reduce odors from the annual spring runoff into the North Saskatchewan River at Edmonton, Alberta. The odors have been characterized as septic, manure, musty, earthy, and hay-like. Despite oxidative treatment, the odors persisted thereby supporting the scientists' belief of the futility of relying strictly on oxidative treatment. Other odor control methods have incorporated aeration with costly additives to control the odors.

Other efforts are underway to reduce or eliminate manure odors. For example, the University of Minnesota Agricultural Engineering department recently began a project to measure, chart, and record odors emitted from different livestock production sites around Minnesota. As one engineer states, there is currently very limited knowledge about the odor from hog production systems. The main thrust of the project is to develop a database to assist communities and pork producers in developing reasonable expectations about odor. At the national Center for Agricultural Utilization Research in Peoria, Ill., researchers sought one million dollars to attack the malodorous nature of manure. Other problems tabled for action include air and groundwater quality.

The use of ozone is well known as a disinfectant or sterilizing agent. In general, due to its disinfecting properties, ozone has not been considered as a viable or feasible alternative when treating manure pits or lagoons. The conventional wisdom is that disinfection caused by the use of ozone would interfere with the microbiological balance within wastewater slurries, wherein solids are digested through the use of activated sludge.

Furthermore, the use of ozone within a confined area is subject to OSHA regulations. Exposure to concentrations of one part per million for over 10 minutes often leads to irritation of the eyes, nose, throat, and other adverse symptoms. The designs of ozone dispersal systems are often disadvantaged by an uneven distribution of ozone and therefore contribute to animal and human exposure to excess levels of ozone. A system designed to prevent accidental exposure to excessive levels of ozone would therefore be an improvement in the art.

DESCRIPTION OF THE RELATED ART

The following references are herein incorporated by reference.

In the article entitled, "*EVALUATION OF ODOUR REMOVAL BY PILOT-SCALE BIOLOGICAL TREATMENT PROCESS TRAINS DURING SPRING RUNOFF IN AN ICE-COVERED RIVER*", Wat Sci. Tech. Vol. 31, No. 11, pp. 195–201, (1995) S. E. Hrudley, P. M. Huck, M. J. Mitton, and S. L. Kenefick teach biological treatment of runoff water having a strong odor characterized as septic, manure, musty, earthy, and hay-like. Biological treatment using granular activated carbon can produce an essentially odor-free effluent during a transient raw-water odor event. On the other hand, for odor reduction the scientists teach the futility of relying on a strictly oxidative treatment such as ozone.

U.S. Pat. No. 5,397,474 to Henry teaches the use of air as an oxygen source that enables the breakdown of organic acids contained in manure through the use of facultative microorganisms.

U.S. Pat. No. 3,658,305 teaches aeration of liquid animal waste in a pit.

U.S. Pat. No. 3,633,547 to Stevens et al. teaches a system for maintaining an animal confinement area wherein the confinement area is ventilated to reduce objectionable odors.

U.S. Pat. No. 3,773,659 to Carlson et al. teaches liquid manure treated by enzymatic and aerobic biodegradation facilitated by enzyme producing microorganisms. The manure is removed from collection areas and introduced into reactors for treatment.

U.S. Pat. No. 3,960,718 to Lebo teaches the use of ozone as a sterilizing agent in sewage treatment.

U.S. Pat. No. 5,298,198 to LaCrosse teaches the purification of wastewater from a swine manure pond through an aerator at relatively low flow rates and pressures.

U.S. Pat. No. 3,884,804 to Robinson et al. teaches the use of "Contacogen" particles comprising solid catalyst portions having hydrophobic surface portions, wherein the particles are floated on the surface of a slurry of animal wastes. The particles promote the oxidation by air of the odoriferous compounds produced by the degenerative breakdown of the animal wastes.

U.S. Pat. No. 5,656,246 to Patapoff et al. teaches a wastewater treatment process incorporating ozone as a sterilizing agent, and oxidation technology. The waste must be transported to the reactor from the normal collection areas.

U.S. Pat. No. 5,071,566 to Papp et al. teaches a method of treating a slurry of liquid pig manure by simultaneously adding at several ingredients at separate and consecutive places in the flow direction of the liquid substance.

U.S. Pat. No. 5,290,451 to Koster et al. teaches a liquid manure treatment process incorporating an aerated reactor, a denitrification reactor, a liquid/solid separator, and sedimentation tanks. The waste must be transferred to the process from the normal collection areas.

U.S. Pat. No. 5,616,163 to Halfter teaches a liquid manure treatment process incorporating aeration as a method of stripping odorous substances.

U.S. Pat. No. 5,053,140 to Hurst teaches a method for food process water purification utilizing ozonation. Ozone is clearly taught as destructive to bacteria.

Despite ongoing efforts, there is still a need for a cost-effective system that comprehensively reconciles the problems described above, and thereby reduces or eliminates manure odors in and around a manure collection pit, provides stable solids management within the pit, and reduces or eliminates the insect/fly population in and around the manure collection areas. Given the moratoriums on hog production due to ongoing odor concerns, it becomes quite clear that methods of control such as simple aeration and/or covering the smell through pit additives, for example, simply do not achieve the necessary odor reduction required.

SUMMARY OF THE INVENTION

Accordingly, an object of the present invention is to deodorize and disinfect by oxidizing airborne pollutants often found in confined areas such as a barn, a restaurant, a refrigerator, or a factory, for example.

Another object of the present invention is to reduce the dust levels typically found within a barn thereby eliminating a primary disease vector.

Another object of the present invention is to reduce the relative humidity typically found with a barn.

Another object of the present invention is to deodorize the manure slurry contained within a manure pit.

Another object of the present invention is to reduce and/or eliminate the fly population often associated with organically polluted areas.

Yet another object of the present invention is to prevent manure crust formation and eliminate a fly breeding ground, thereby further eliminating a primary disease vector from the farm to the community.

These and other objects are solved by an ozone injection system that homogeneously ozonates the air within a confined area such as a barn and, if necessary, also within an upper stratum of liquid manure contained in a manure pit housed within a confined area such as barn. The homogeneously dispersed ozone significantly reduces the dust by functioning as a precipitating agent. In addition, the ozone significantly reduces the relative humidity by functioning as a coalescing agent. In further accordance with the present invention, an upper stratum of a liquid volume in the pit is ozonated while maintaining anaerobic conditions in a lower stratum. This permits anaerobic digestion of manure waste, for example, while still eliminating the odoriferous gases through oxidation in the ozonated/upper stratum.

In another aspect of the invention, a significant amount of air within the confined area is recirculated through at least one perforated tube, or, through a chamber or plenum formed by a plurality of walls, and then through at least one perforated tube wherein elevated levels of ozone exceed OSHA exposure limits. The elevated concentration of ozone, 0.1 to 5 PPM or greater, results in hyper-ozonation of the recirculated air and can be safely applied while the air remains within the tubes or chamber. The tube(s) are perforated to permit reentry of the hyper-ozonated air into the barn. The perforations are calibrated to maintain an average ozone concentration of less than or equal to 0.1 PPM throughout the barn. The barn air is thus purified by a two-tier ozonation system wherein hyper-ozonation is accomplished within a confined area and then a lower grade ozonation is effected throughout the barn at 0.1 PPM or less.

Alternatively, hyper-ozonation may also be applied by recirculating air from a lower part of the barn to an unoccupied area of the barn such as an attic. Ozone is injected into the attic at levels well above OSHA permissible exposure limits, 0.1–5 PPM for example. The floorboards of the attic are perforated to permit reentry of the treated air into the barn, at average ozone concentrations at less than or equal to 0.1 PPM. The same principle may be practiced by utilizing a remote and uninhabited building instead of an attic. Again, air is recirculated from a livestock building to the remote building. The remote building is injected with ozone resulting in ozone concentrations again in excess of 0.1 PPM. An ozone detector and ozone destructor are placed within the remote building to ensure that treated air routed back to the livestock building retains ozone at levels of 0.1 PPM or less.

In accordance with these and other objects, the present invention oxidizes organic and inorganic gases such as those naturally associated and produced with manure, and also those gases resulting from its bacteriological breakdown. The injection of ozone into the contaminated air and fluids deodorizes and disinfects thereby effectively controlling the odors emitted therefrom. It has been discovered that ozone at lower levels does not interfere or destroy the microbiological balance within the pit. The pit balance is, counter-intuitive to what would be expected, actually enhanced thereby facilitating an efficient breakdown of the solids within the pit. In addition, the ozone, through actual fly counts, has also been shown to reduce the fly population.

Ozone is pumped through remote or on site ozone generators through a perforated tube or plurality of tubes above the animals in the animal containment area. The homogeneous distribution of ozone oxidizes the odorous gases within the barn air.

In a first approach to ozonating the pit, a perforated tube or plurality of perforated tubes extends across the pit within an upper portion of the total volume, most preferably in the upper fourth portion of the total volume. When ozone is forced into the perforated tubing, the gas is evenly dispersed through an upper portion of the liquid that approximates one fourth of the total volume. The odorous gases thus contact the ozone and are oxidized prior to their release into the atmosphere.

In a second approach to ozonating the pit, a buoyant vehicle is randomly and preferably propelled across the surface of the manure liquid by electrical propulsion. A preferred embodiment contains an electrically actuated pump thereby providing a propulsion means for propelling the vehicle across the surface of the pit. Ozone is diffused into the slurry by way of a gas injector. The ozone and electrical power are preferably introduced at or near the bottom of the pit. Ozone, at concentrations described herein, functions as a powerful oxidant that virtually eliminates the odors by oxidizing odorous gases, and yet maintains a facultative aerobic/anaerobic microbiological balance in the manure slurry. The random movement of the buoyant vehicle creates an ozonated "cap" or oxidation zone in about the upper quarter of the slurry container, thereby eliminating the odor causing gases prior to their release into the atmosphere. Concurrently, an anaerobic state persists below the "cap" thereby permitting anaerobic digestion of the manure. The vehicle is also heavy enough to fragment any floating masses of manure crust thereby eliminating the fly breeding ground and also further inhibiting an anaerobic state and acute odors in the liquid manure.

DETAILED DESCRIPTION OF THE PREFERRED EMBODIMENT(S)

Figure 1:
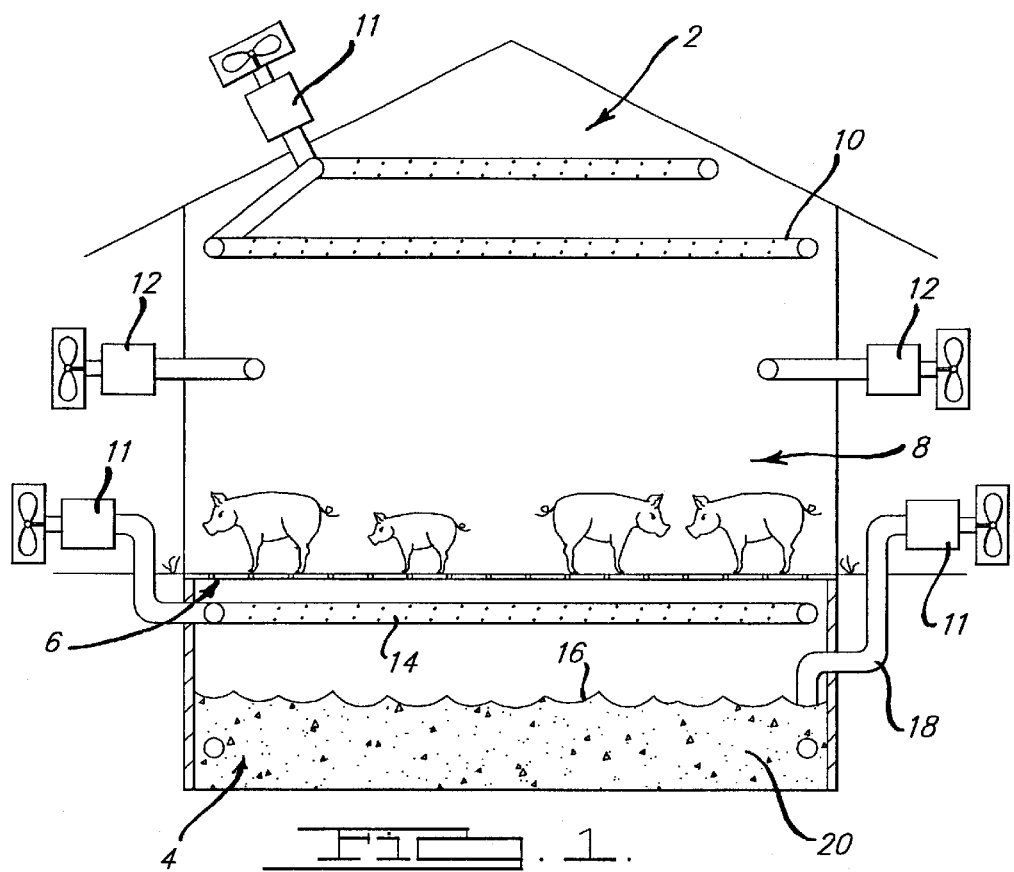
FIG. 1 illustrates a first embodiment of a hyper-ozonation system for oxidation of airborne pollutants.

In a first embodiment shown in FIG. 1, an ozone injection system for a livestock building 2 containing a manure pit 4 covered by a grate 6 is illustrated. At least one set of one or more perforated tubes 10 extends about an animal containment area 8 thereby affecting homogeneous distribution of ozone throughout the air. The first set of one or more perforated tubes 10 fluidly communicates with an ozone generator 11 thereby oxidizing the contaminants within the air. If desired, optional ozone generators 12 may also target areas of acute odor. In a second aspect of the invention, the manure pit 4 is housed below the grate 6 through which manure is dropped by the livestock and then collected within the pit 4. An optional second set of one or more perforated tubes 14 extends across the gap between the grate and the surface 16 of the liquid volume within the pit 4. The second set of one or more perforated tubes 14 also fluidly communicates with the ozone generator 11. An ozone dispersal system 18 connected to an ozone generator 11 extends across an upper portion or "cap" 20 of the liquid volume within the pit 4, thereby controlling the odors and flies therein.

In accordance with the present invention, a significant amount of air within the barn is recirculated through a plurality of perforated tubes 10 and 14 that contain elevated levels of ozone that exceed OSHA exposure limits. The elevated concentration of ozone, 0.1 to 5 PPM or greater, results in hyper-ozonation of the recirculated air while it remains within the tubes 10 and 14. The tubes are perforated to permit reentry of the hyper-ozonated air into the barn. The perforations are calibrated to maintain an average ozone concentration of less than or equal to 0.1 PPM throughout the ban. The barn air is thus purified by a two-tier ozonation system wherein hyper-ozonation is accomplished within the tubes (or chamber) and then a lower grade ozonation is effected throughout the barn at 0.1 PPM or less.

Figure 2:
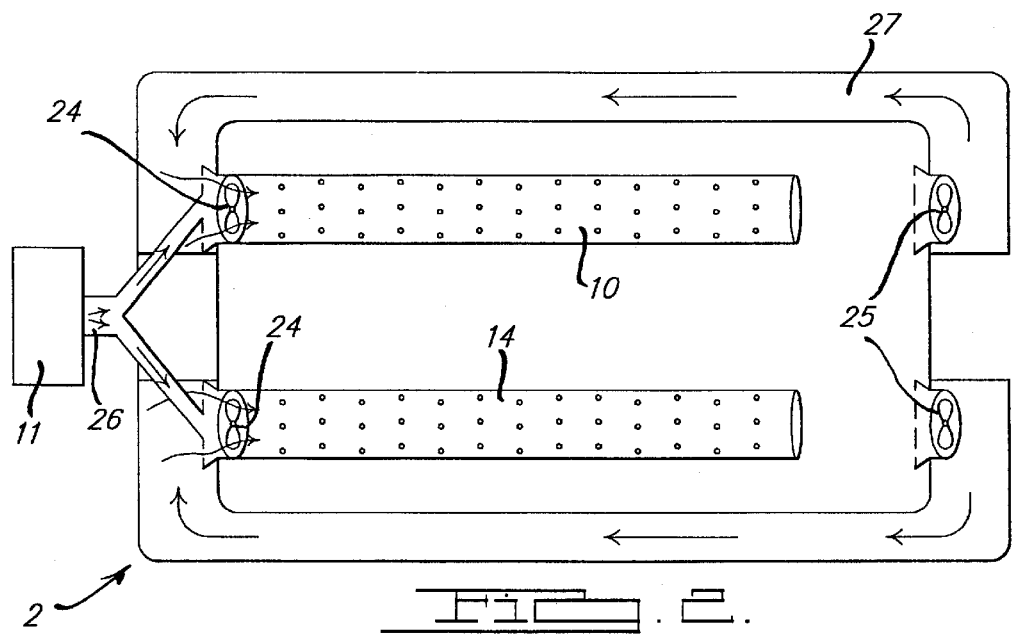
FIG. 2 illustrates a second embodiment of a hyper-ozonation system for oxidation of airborne pollutants.

In a second embodiment shown in FIG. 2, outlet fans 25 or other means such as a blower, more preferably recirculate a substantial amount of air drawn from a confined area such as a barn. "Substantial" is defined as 50% or more, and most preferably 70–80%, of the total air being drawn through the fans. The air recirculated through the fans 24 is either drawn directly from the barn itself, or, is channeled through outlet fans 25 then into a conduit 27 in fluid communication with the intake fans 24. The remaining amount of air consists of fresh air and ozone drawn from ozone generator 11. The fans 24 blend the recirculated air with the fresh air/ozone mixture. The treated air is then forced through perforate tubes 10 and 14 and homogeneously distributed throughout the ban. The balance of the air is fresh makeup air provided with the ozone through lines 26, for example. Recirculation of the barn air conserves heat during the winter and at the same time reduces the likelihood of cross-contamination from farm to farm. In accordance with the present invention, the average concentration of ozone is far greater within the tubes 10 and 14 than it is once homogeneously distributed throughout the barn. In fact, it approximates 0.1–5 PPM within the tubes thereby enhancing the deodorizing and disinfecting of the recirculated air within. Once the hyper-ozonated air leaves the tubes 10 and 14 and then mixes into the ambient barn atmosphere, the ozone level drops to an average concentration of 0.01 to 0.1 PPM. "Homogeneous distribution" is herein defined to mean approximately equivalent ozone concentrations throughout the barn interior. Tubes 10 and 14 are calibrated to provide homogeneous concentrations of safe levels of ozone. Strategic placement of tubes 10 and 14 throughout the interior of the barn provides homogenous distribution of ozone throughout at an average concentration of 0.1 PPM or less, resulting in a secondary deodorization and disinfection that complies with OSHA exposure limits.

Figure 3:
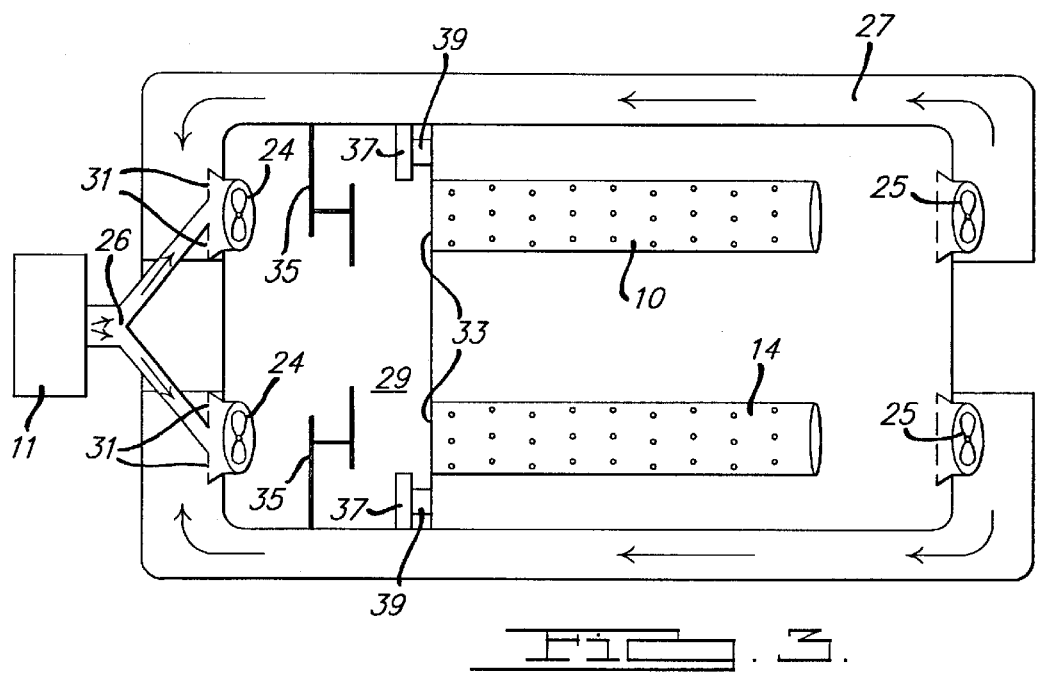
FIG. 3 illustrates a third embodiment of a hyper-ozonation system for oxidation of airborne pollutants.
Figure 4:
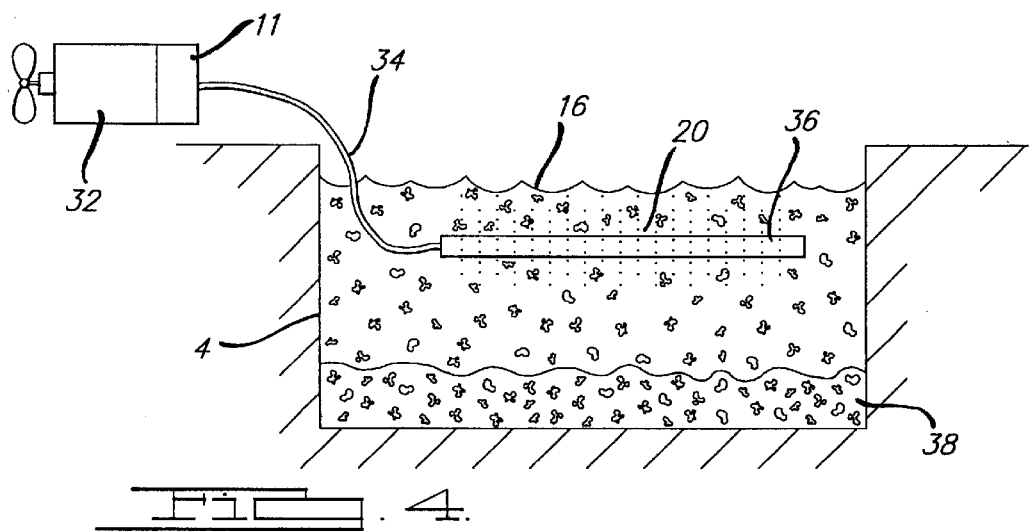
FIG. 4 illustrates a first approach to ozonating a pit in accordance with the present invention.

In accordance with a third embodiment shown in FIG. 3, recirculated air in the amounts stated above is pumped through fans 24 into a chamber 29 formed by one (spherical) or more walls. A mixture of fresh air and ozone is drawn from ozone generator 11 through tubes 26 then through fans 24 and into chamber 29. The pollutants within the recirculated air are then oxidized within the chamber. Chamber 29 is airtight except for the inlet and outlet ports 31 and 33, respectively. The level of ozone maintained within chamber 29 is greater than 0.1 PPM and more preferably from 1.5 PPM to 5 PPM. If desired, at least one baffle 35 is provided within chamber 29 to slow the flow of air therethrough. At least one optional ozone monitor 37, adjacent to the outlet port 33, samples the treated air to determine the ozone concentration prior to discharge of the air through tubes 10 and 14. The monitor 37 can be purchased from 03 DETECTOR COMPANY in Tucson, Ariz., for example. At least one ultraviolet light 39, preferably ranging from 240–260 manometers, and more preferably from 253 to 256 nanometers, and most preferably at 253.7 nanometers is optionally provided within chamber 29. The UV light 39 synergistically enhances odor neutralization and disinfecting of airborne bacteria, and also functions to destroy any excess ozone that would create ozone concentrations greater than 0.1 PPM once the treated air is dispersed through tubes 10 and 14. The UV light 39 is therefore preferably operable based on a signal generated by the monitor 37. If the ozone exceeds a predetermined threshold level, the monitor 37 triggers operation of the UV light 39 thereby ensuring an ozone concentration less than or equal to 0.1 PPM.

Figure 8:
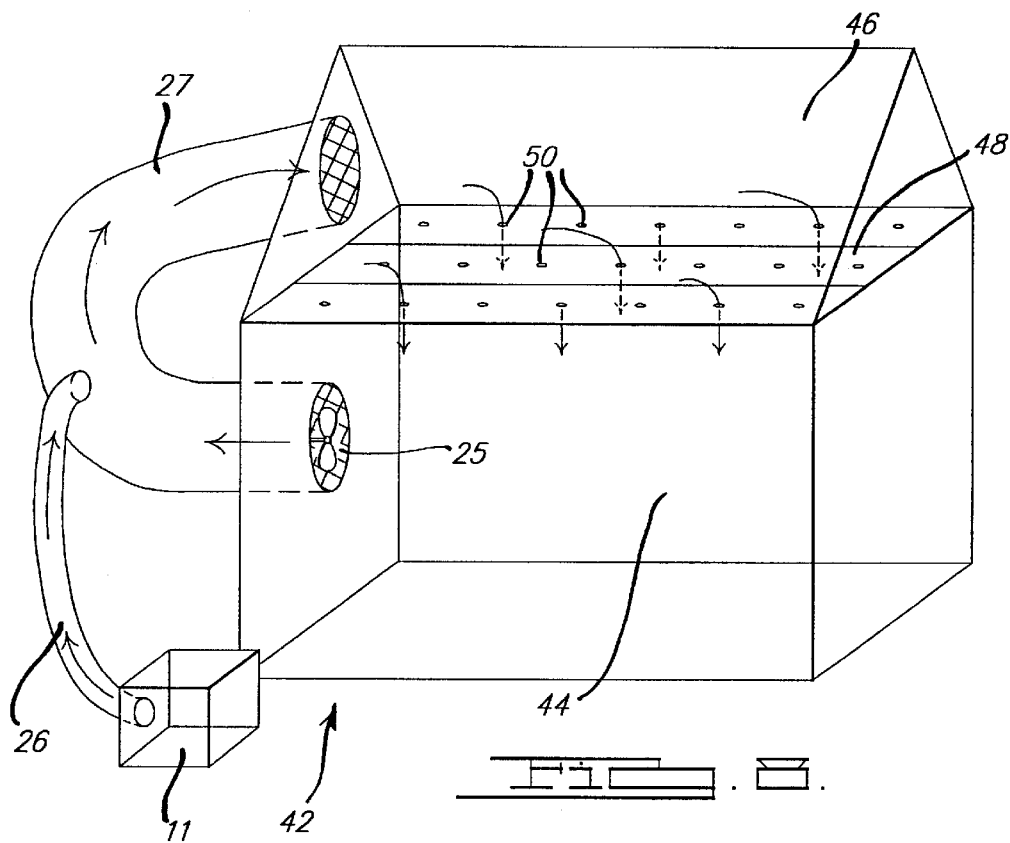
FIG. 8 illustrates a fourth embodiment of a hyper-ozonation system for oxidation of airborne pollutants.

As shown in FIG. 8, the same principle can be applied within a building 42 having two or more floors, for example. A lower region 44 and an upper region 46, each formed by a plurality of walls, fluidly communicate via a conduit 27, and constitute the functional equivalent of the barn interior 2 and the chamber 29 shown in FIG. 3. A floor 48 contains perforations 50 and separates regions 44 and 46. One or more outlet fans 25 contained in region 44 fluidly communicate with conduit 27, thereby recirculating the air throughout building 42. A remote ozone generator 11 contains an outlet tube 26 for conveying an air/ozone mixture to conduit 27. In operation, fans 25 draw air from region 44 into conduit 27. The high volume of air passing through conduit 27 creates an aspirating effect thereby drawing an ozone/fresh air mixture from generator 11 through tube 26 and then into conduit 27. The air then passes into region 46, wherein ozone oxidizes the airborne pollutants, and then passes through perforations 50 back into region 44.

The air in region 46 thus comprises a mixture of ozone, fresh air, and recirculated air. Generator 11 generates enough ozone to establish ozone concentrations in excess of 0.1 PPM within upper region 46. The residence time of the air mixture within region 46 may of course be varied based on the pressure generated by fans 25, on the size and number of perforations 50 found in floor 48, and/or on the negative pressure created in region 44 when air is drawn therefrom into region 46. Perforations 50 are calibrated to maintain an ozone concentration less than or equal to 0.1 PPM in occupied region 44.

Figure 9:
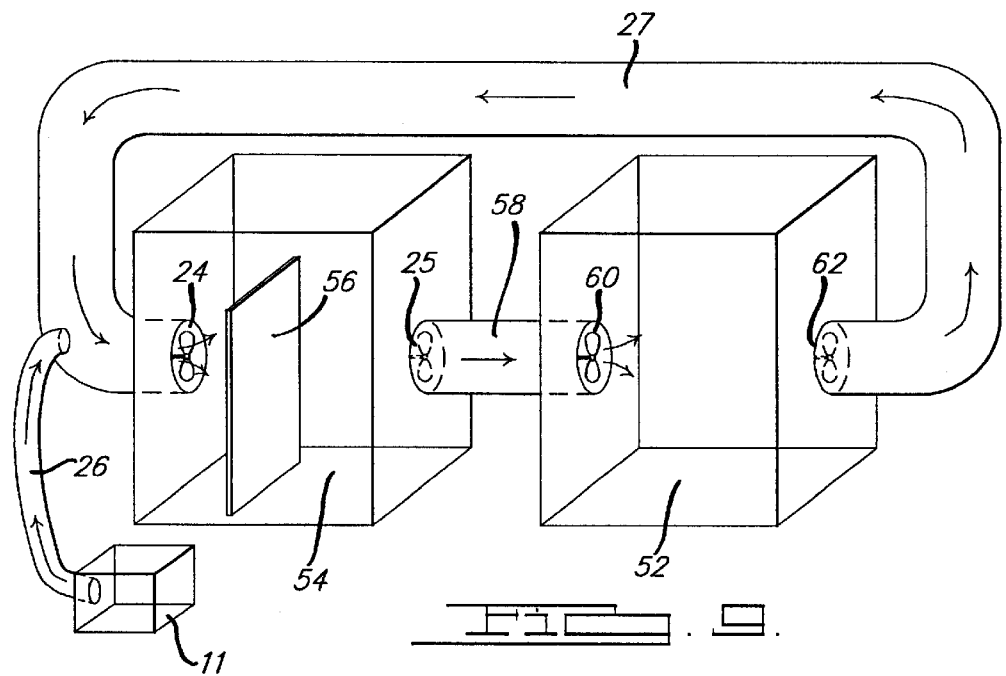
FIG. 9 illustrates a fifth embodiment of a hyper-ozonation system for oxidation of airborne pollutants.

As shown in FIG. 9, the same principle may also be applied by drawing air from a first building 52 and hyper-ozonating the air as it passes through a second building 54. Again, buildings 52 and 54, each formed by a plurality of walls, constitute the functional equivalent of the barn (or confined area) 2 and the chamber (or plenum) 29 shown in FIG. 3. Fan 62 fluidly communicates with conduit 27 and draws air from building 52 into conduit 27. The flow of air aspirates an ozone/fresh air mixture from generator 11 via tube 26. Fans 24 and 62 the resultant mixture through conduit 27 and into building 54 wherein the ozone oxidizes any airborne pollutants. Baffle 56 within building 54 may optionally be employed to increase the residence time within building 54. Fans 25 and 60 fluidly communicating with conduit 58 then pump the treated air back into the building 52.

Thus, steady state two-tier ozonation can generically be described as hyper-ozonation of recirculated air in a plenum or chamber void of animals or humans. The hyper-ozonated air is then pumped back to its source wherein the ozone is maintained at a level of 0.1 PPM or less.

In each of the embodiments described above, the total ozone transferred to the interior of the barn 2 is about 0.01 to 0.1 parts per million at steady state. Nevertheless, ozone startup and makeup rates may be greater and may initially constitute for example, up to 0.2 PPM. In general, exposure to ozone concentrations above 1 part per million for over 10 minutes often leads to irritation to the eyes, nose, throat, and other adverse symptoms. Therefore, the average ozone concentration at steady state should not exceed 0.1 parts per million.

It has been unexpectedly discovered that the ozone levels applied in accordance with the present invention also contribute to a reduction in the fly population. It is believed that ozone retards maturation of the fly larvae thereby reducing the population. Fly counts before and after ozonation show a marked reduction in the number of flies present.

As shown in Tables 1A and 1B, ozone oxidizes odoriferous compounds found in untreated barn air. When compared to other confined areas such as a restaurant, kitchen, or refrigerator, a livestock area is particularly known for its higher concentration of airborne pollutants, and as such, its acute and offensive odors. Thus, the test data merely exemplifies the efficacy of the invention and should not be construed as limiting in scope. As one of ordinary skill will readily appreciate, the oxidizing properties of ozone induce equivalent chemistry in the presence of any oxidizable gaseous compound, regardless of how and where the gas is generated. Treatment of the air in other confined areas is therefore certainly contemplated.

TABLE 1A

| Compound Tested | Ozonated | Untreated |
|---|---|---|
| $NH_4$ | 12 PPM | 22 PPM |
| $H_2S$ | .75 PPM | 1.25 PPM |
| $CO_2$ | 0.6% | 0.2% |
| $O_3$ | 0.08 PPM | 0 PPM |

A SENSIDYNE™/GASTEC DETECTOR TUBE AIR SAMPLING SYSTEM was used to sample air taken from a barn having an air volume of 90,000 $ft^3$. For example only, the barn was treated using an ultraviolet ozone gas generator attached to a fan 20 inches in diameter and rated at 5000 $ft^3$ per minute. The ozone was transferred across the barn through a perforated tube 20 inches in diameter and 250 feet in length, wherein one-inch holes were evenly spaced 28 inches apart at the three and nine o'clock positions. As shown in Table 1A, ammonia and hydrogen sulfide concentrations were substantially reduced after steady state concentrations of 0.08 PPM ozone were attained. One of ordinary skill in the art will readily appreciate the potential of altering the variables given above.

In accordance with a preferred embodiment of the present invention, recirculated air was mixed with fresh air and ozone, and then forced through the hyper-ozonation tube 10 or 14, as shown in FIG. 2. As shown in Table 1B, data generated from air samples obtained inside a hyper-ozonation tube were compared to data generated from air samples obtained from outside of the hyper-ozonation tube, but still within the barn. The barn again had a total volume of 90,000 $ft^3$, or dimensions totaling 45 feet in width, 250 feet in length, and 8 feet in height. Four Advanced Oxidation Generators (AOG) were used wherein each AOG comprised 12 tubes of G64, and produced 185 Nanometers UV light. The ozone gas generators were attached to a fan 20 inches in diameter and rated at 5000 cubic feet per minute. The ozone was transferred across the barn through a perforated tube 20 inches in diameter and 250 feet in length, wherein one-inch holes were evenly spaced 28 inches apart at the three and nine o'clock positions. The hyper-ozonated atmosphere within the tube averaged 50–80% recirculated air and 20–50% ozone/fresh air mixture. The gases were measured using a SENSIDYNE™/GASTEC DETECTOR TUBE AIR SAMPLING SYSTEM. Optical particle counts were measured using a laser particle analyzer from 0.1 to 10 microns, at a 2.5 L/min flow rate for a one-second sampling period. Odors were evaluated using a BARNEBY & SUTCLIFFE scentometer, model SCC.

TABLE 1B

| Measurement | Hyper-Ozonation Atm. (Inside Tube) | Untreated Barn Atm. (Outside Tube) | Net Increase/ Decrease |
|---|---|---|---|
| Ozone | 1.5 PPM | 0 PPM | NA |
| Ammonia | 1.5 PPM | 20 PPM | 92.43% Decrease |
| Hydrogen Sulfide | 0.26 PPM | 1.37 PPM | 80.83% Decrease |
| Humidity | 38% | 72% | 46.69% Decrease |
| Dust Particle | 0.21 $mg/m^3$ | 1.33 $mg/m^3$ | 84.05% Decrease |
| Odor | 2 Dilution | 350 Dilution | 99% Increase |

As shown in Table 1B, the ozone level inside the tube was markedly greater than that outside of the tube. The total concentrations of ammonia, hydrogen sulfide, humidity and dust particles were substantially decreased within the tube indicating the marked improvement in air quality when recirculating a substantial amount of the barn air through the two-tier ozonation system. Given a constant temperature, net neutralization of obnoxious gases and deodorization, with or without ultraviolet light, is a function of ozone concentration and contact time (inside the tube or hyper-ozonation chamber). In essence, the scentometer determines an approximate dilution where odor is notably present. For example, a dilution factor of 2 indicates that two parts of fresh air when diluted by one part of untreated air results in detectable odor. In the same way, a dilution factor of 350 indicates that 350 parts of fresh air when diluted by one part of untreated air results in detectable odor. The higher the dilution factor, therefore, the greater the odor of the untreated air. As the air is repeatedly recirculated through the hyper-ozonation treatment system, the dilution factor of the general barn atmosphere (preferably maintained at 0.08 to 0.1 PPM ozone) gradually and notably decreases.

Figure 5:
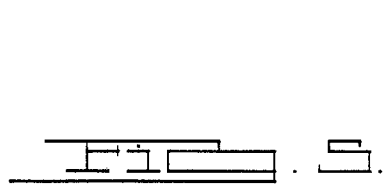
FIG. 5 illustrates a plurality of perforated tubes forming a grid.
Figure 5:
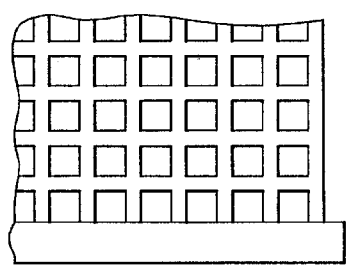

In a first approach to dispersing ozone within the pit, FIG. 5 shows a gas generator 11 containing a pump 32 fluidly communicating with an airtight tube or plurality of tubes 34. The generator 11 is housed next to a manure pit 4. Airtight tubes 34 fluidly communicate with a perforated tube or plurality of perforated tubes 36. As shown in FIG. 1, tubes 36 extend into the manure pit wherein holes within the tube(s) are preferably but not necessarily spaced one inch apart and thus facilitate an even percolation of ozone into the slurry. Gaseous ozone is produced by generator 11 and is transferred by pump 32 through airtight tube(s) 34 into the perforated tube or plurality of perforated tubes 36. In accordance with the present invention, ozone is supplied to the liquid within the cap 20 at about 0.1 to 1 milligrams of ozone per gallon of manure slurry per day (steady state), although startup and makeup rates may be greater. As shown in FIG. 1, a lower anaerobic stratum 38 is maintained in at least the lower half of the pit 4.

For example, the upper fourth of a 10-foot deep pit extends 2.5 feet down from the surface 16. This represents the treated "cap" 20, or in an untreated pit, a less turbid fluid based on sedimentation. For a pit consisting of approximately one million gallons, 250,000 gallons would be pumped at a rate of about 173.6 gallons/minute. Taking the ozone mass flow rate given above at 0.1–1 mg/gallon of slurry per day, the range of ozone generally required would be about 17.36–173.6 milligrams/minute. In essence, a one million-gallon manure pit would require about 25–1000 grams of ozone per day depending on the bacterial breakdown of the manure. As the bacterial activity increases, odoriferous gases such as hydrogen sulfide, ammonia, and methane are produced. Greater concentrations of bacteria, due to factors such as nutrient rich manure and increased temperature, will require greater concentrations of ozone to control the resulting odor and oxidize undesirable gases.

Figure 6:
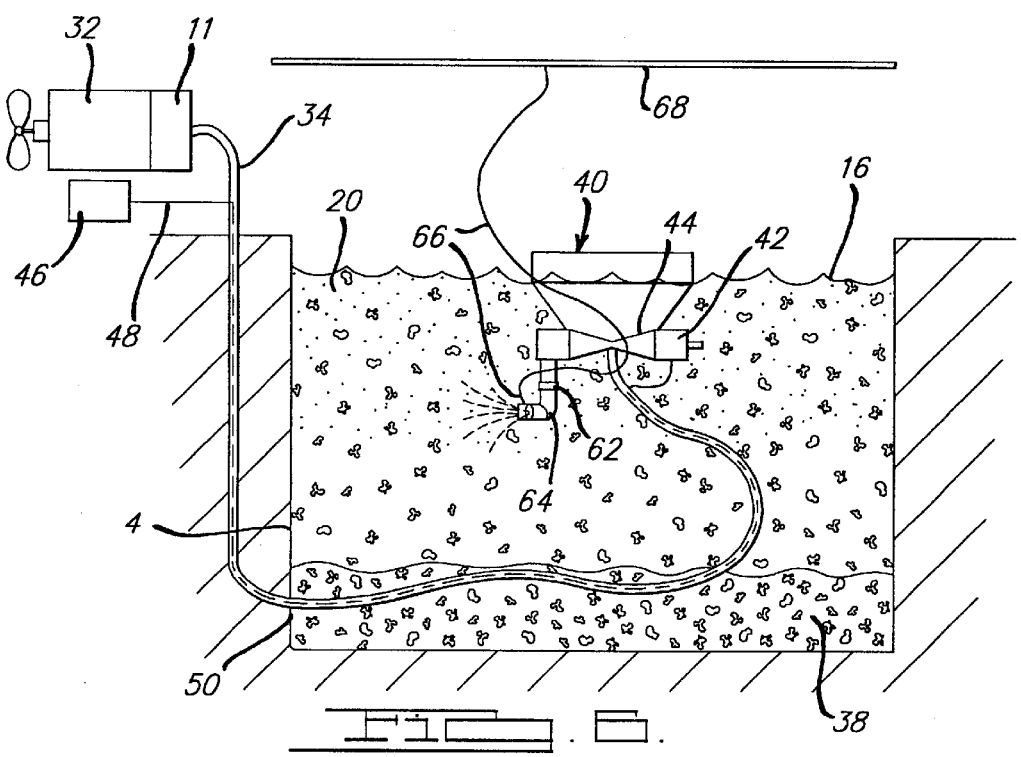
FIG. 6 illustrates a second approach to ozonating the pit in accordance with the present invention, wherein the buoyant vehicle shown not only ozonates the liquid containment area, but also fragments any crust tending to form on the surface of the slurry.

The perforated tubes 36 are preferably arranged either in a grid network, as shown in FIG. 6, or in a plurality of horizontally parallel sections at one to two feet below the surface of the liquid. Each tubing 36 is preferably spaced 10 to 15 feet from other parallel sections in either the grid or parallel orientation. The "cap" 20, or upper stratum of treated liquid, is formed about the tubing 36 as a steady stream of stratified ozone reacts with the pollutants rising through the pit. The ozone bubbled into the liquid quickly reacts with gases such as mercaptans, methane, carbon monoxide, and other organic matter, and also functions as a pathogen disinfectant.

The temperature of the manure and the concentration of the waste gases will affect the residence time of the ozone. As the temperature decreases, the reaction time slows and the residence time of the ozone is increased. Conversely, the residence time is decreased as the temperature and reaction rate increase. In general, depending on the reaction conditions described above, the residence time of the ozone is believed to be between 0–5 minutes.

Figure 7:
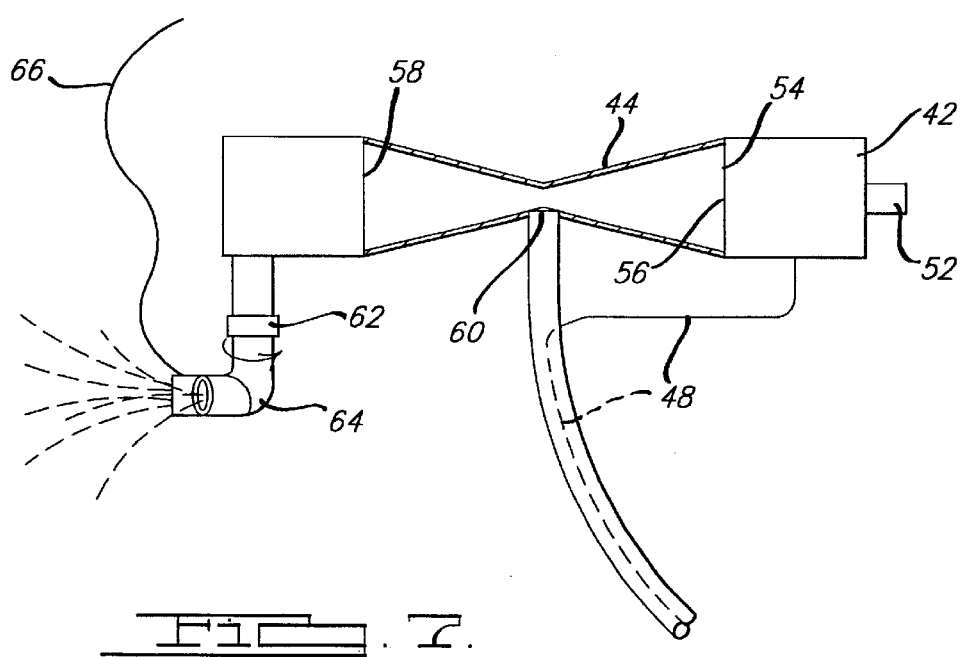
FIG. 7 illustrates a gas injector and a propulsion manifold employed in the second approach to ozonating the manure pit.

In a second approach to ozonating an upper stratum 20 within the pit 4, shown in FIG. 7, ozone produced by generator 11 is transferred by pump 32 through an insulated and airtight tube or plurality of tubes 34 to a buoyant vehicle 40. Additionally, as shown in FIGS. 7 and 8, the vehicle 40 contains a pump 42 and a gas injector 44 wherein the injector 44 is commercially available and sold by, for example, Mazzei Injector Corporation located in Bakersfield, Calif. In a preferred embodiment, an electrical source 46 actuates pump 42. As shown in FIGS. 7 and 8, an electrical line 48 supplies pump 42 with electrical power from source 46. In accordance with the present invention, insulated and airtight tube(s) 34 not only transfers ozone to injector 44, but also encloses the electrical line 48 thereby facilitating a safe transfer of electrical power. As further shown in FIG. 7, the electric power in line 48 and the ozone transferred from generator 11, both contained within the insulated and airtight tube(s) 34, are preferably introduced through an insulated port 50 near or at the bottom of the pit 4.

In accordance with the present invention and as shown in FIG. 8, the pump 42 contains an inlet port 52 in fluid communication with an outlet port 54. Injector 44 contains a liquid inlet port 56 fluidly communicating with pump outlet port 54, a liquid outlet port 58 fluidly communicating with liquid inlet port 56, and a gas inlet port 60 fluidly communicating with injector ports 56 and 58. A union 62 rotatably connects the liquid outlet port 58 of the gas injector 44 with a propulsion manifold 64 of vehicle 40. The propulsion manifold 64 is preferably bifurcated into two or more propulsion tubes at acute angles from one another. As the vehicle 40 is propelled across the surface 16 to either end of the container 4, the bifurcated propulsion manifold 64 exerts a bias on the rotatable union 62. The propulsion direction as shown in FIGS. 7 and 8 can thus be randomly varied without changing the general orientation of the vehicle 40. The bifurcated and rotatable propulsion manifold 64 thus prevents kinks in the airtight and insulated ozone/electric tube(s) 34 and yet still facilitates migration of the vehicle 40 throughout the pit 4.

A guideline 66, connected to a control line 68 extending above or below (not shown) the container 4, is also connected to the rotatable propulsion manifold 64. Movement of the vehicle 40 is thereby constrained to just within the periphery of the pit 4. Other configurations are also contemplated. For example, the guideline 66 could be rotatably connected to the top of vehicle 40. The vehicle 40 is preferably constructed from corrosion resistant materials such as stainless steel, fiberglass, or treated wood.

Vehicle 40 is thereby electrically propelled by pump 42 across the surface 16 of the cap 20 within the container 4. The random movement of the vehicle 40 not only serves to distribute the ozone across the pit 4, but also agitates and mixes the ozone into the liquid thereby ensuring a homogeneous ozone dispersion within the resultant water cap 20. One of ordinary skill in the art will readily appreciate that other methods of propulsion may also be used.

In each approach, the effectiveness of the ozone may be improved simply through on-site filtration of the liquid within the pit 4. Flocculation, sedimentation, and other well-known filtration and separation techniques are effective in reducing the total suspended solids. Ozone may be produced by ultraviolet lighting, by cathode ray tubes, or by other methods known in the art. Ozone generators are commercially available, for example, from Fuller Ultraviolet Corporation in Frankfort, Ill. Ultraviolet ozone generation is preferred, given the maintenance ease.

Table 2 indicates various characteristics of a manure slurry within a pit operating under ozonated steady state conditions as described above. Sample 1 was taken shortly after steady state conditions were achieved. Sample 2 was taken about a month thereafter and illustrates the stability of the pit over an extended period of time. All tests were conducted based on methods documented in *Standard Methods for the Examination of Water and Wastewater,* 14th Edition (1975) *and* 15th Edition (1980), *Washington D.C.: American Public Health Association, Inc.,* the teachings of which are herein incorporated by reference.

TABLE 2

| Sample and Characteristic | Influent Pipe | Surface Bank | 1 Foot Depth Top | 2–3 Foot Depth Midpoint | 5 Foot to Bottom |
|---|---|---|---|---|---|
| Sample 1:NH3 nitrogen (mg/L) | 376 | 372 | 380 | 424 | 528 |
| Sample 2:NH3 nitrogen (mg/L) | 500 | 331 | 337 | 336 | 296 |
| Sample 1: BOD (mg/L) | 943 | 420 | NA | 360 | 360 |
| Sample 2: BOD (mg/L) | 541 | 122 | 120 | 143 | 217 |
| Sample 1: COD (mg(L) | 3222 | 1272 | 1016 | 1121 | 31936 |
| Sample 2: COD (mg/L) | 1908 | 753 | 644 | 803 | 1724 |
| Sample 1: TDS (mg/L) | 1360 | 1190 | 1240 | 1440 | 1330 |
| Sample 2: TDS (mg/L) | 1603 | 1050 | 1083 | 1113 | 1077 |
| Sample 1: PH | 7.41 | 7.45 | 7.55 | 7.82 | 7.38 |
| Sample 2: PH | 7.482 | 7.798 | 7.490 | 7.827 | 7.785 |
| Sample 1: Odor Average | 2.33 | 1.167 | 1.5 | 0.67 | 1.33 |
| Sample 1: Odor Std. Dev. | 0.52 | 1.169 | 1.38 | 0.52 | 0.52 |
| Sample 2: Odor Average | 3 | 0.167 | 0.167 | 0.333 | 0.333 |
| Sample 2: Odor Std. Dev. | 0 | 0.406 | 0.408 | 0.516 | 0.816 |
| Sample 1: Anaerobic Bac. Ave. Counts | $5.86 \times 10^6$ | $1.93 \times 10^6$ | $1.57 \times 10^6$ | $1.97 \times 10^6$ | $2.47 \times 10^6$ |
| Sample 1: Anaerobic Bac. Std. Dev. | $2.05 \times 10^6$ | $7.5 \times 10^5$ | $3.21 \times 10^5$ | $1.53 \times 10^5$ | $8.39 \times 10^5$ |
| Sample 2: Anaerobic Bac. Ave. Counts | $6.3 \times 10^6$ | $4.1 \times 10^5$ | $2.7 \times 10^5$ | $3.4 \times 10^5$ | $6.3 \times 10^5$ |
| Sample 2: Anaerobic Bac. Std. Dev. | $0.3 \times 10^6$ | $1.2 \times 10^5$ | $0.21 \times 10^5$ | $0.68 \times 10^5$ | $2.2 \times 10^6$ |
| Sample 1: Tot. Coliform Ave. MPN | $1.12 \times 10^6$ | $3.6 \times 10^4$ | $8.54 \times 10^5$ | $2.97 \times 10^4$ | $1.25 \times 10^4$ |
| Sample 1: Tot. Coliform Std. Dev. | $3.29 \times 10^5$ | $1.15 \times 10^4$ | $1.34 \times 10^6$ | $1.15 \times 10^4$ | $1.02 \times 10^4$ |
| Sample 2: Tot Coliform Ave. MPN | $0.3 \times 10^6$ | $1.2 \times 10^5$ | $0.21 \times 10^5$ | $0.68 \times 10^5$ | $2.2 \times 10^6$ |
| Sample 2: Tot. Coliform Std. Dev. | $0.46 \times 10^5$ | NA | NA | $1.1 \times 10^5$ | $0.13 \times 10^5$ |

As shown in Table 2, the anaerobic and aerobic bacteria populations remain balanced with respect to each other throughout the month from Sample 1 to Sample 2. Additionally, the BOD data (biological oxidation demand) indicates a lower biological oxygen demand once the manure slurry leaves the influent pipe into the pit. In general, as the biological oxygen demand is reduced, the aerobic bacteria increase. This is, in addition to the bacterial counts given above, indicative of a balanced pit that results in optimum digestion and treatment of the manure. When the BOD increases, the anaerobic population remains, while the aerobic population is reduced. The outcome is inefficient digestion and poor organic breakdown. This of course leads to acute and volatile odoriferous compounds resulting from a dominant anaerobic activity. In fact, conventional wisdom recognizes that anaerobes in and of themselves digest organic material very slowly or constitute a "stuck digester", remaining in the acid generating mode. Aerobes, on the other hand, operate in a basic or neutral generating mode and thereby balance the acid produced by the anaerobes. The result of a balanced pit containing operable amounts of anaerobes and aerobes as shown in Table 2 (but not thereby limited) is thus a three-fold increase in the breakdown or digestion of organic matter. As shown in Table 2, the uniform pH values, the uniform values of total dissolved solids (TDS), and the consistent coliform counts throughout the pit depth, corroborate this theoretical understanding.

The chemical oxygen demand (COD) clearly shows that at upper depths of the container the COD is respectively much lower than at the lower depths. This indicates formation of the aerobic and anaerobic strata as explained above.

Six panelists trained in olfactory testing evaluated samples from various depths and rated the respective odors on a scale from 0–3 where 0=not offensive, 1=mildly offensive, 2=strongly offensive, and 3=very strongly offensive. As shown in both the Sample 1 group and the Sample 2 group, the odors of the manure containment area were significantly if not almost completely reduced as compared to the odor of the manure flowing through the influent pipe (i.e. not treated).

Additional data established by gas chromatography, and not shown in Table 2, indicates that ozone reduces the volatile phenols, cresol, and skatole. After treatment with ozone: phenols were reduced from 48 mg/L to 12 mg/L; ethyl phenol was reduced from 4.9 mg/L to 1.2 mg/L; cresol was reduced from 146 mg/L to 1.8 mg/L; and skatole was reduced from 2.6 mg/L to 0 mg/L. As evaluated by the purge and trap method, hydrogen sulfide was reduced from 21.0 mg/L to 11.0 mg/L after ozone treatment. The reduction of these odoriferous compounds parallels the odor tests and other data exhibited in Table 2.

Finally, one of the common misconceptions of ozone addition to a pit system is that ozone will deplete the bacteria and cause sterility of the pond, thereby inhibiting organic digestion. As shown in Table 2, contrary to conventional wisdom, the bacterial populations are not eliminated or significantly reduced over time. Rather, in accordance with the present invention, the applied ozone levels eliminate the odors but are not high enough to affect the overall bacterial load within the contained liquid. On a small scale, however, it is believed that the ozone at the concentrations given selectively reduces the pathogen load in the recycle water drawn from the pit. This is largely due to the fact that outside of a living host, pathogens are at a huge ecological disadvantage compared to the desirable bacteria. Since the healthy resident bacteria readily propagate in a healthy pit, and the pathogens cannot, ozone is also beneficial in this regard.

In sum, mechanical agitation and aeration due to ozone addition act to stimulate the aerobic activity of the pit. The outcome is cleaner and safer recycle water, a further reduction in odor, and a more aggressive solids control within the pit. Stated another way, the system acts synergistically to improve the health and the aesthetics of the liquid containment area and the surrounding area.

In essence, ozone has been found to efficiently establish a healthy pit balance thereby resulting in the benefits described above. Furthermore, unlike other oxygenating gases, ozone is unique in that it consists entirely of oxygen and it also exhibits disinfecting as well as deodorizing properties. In accordance with the present invention, when gaseous ozone is homogeneously dispersed throughout the barn air, ozone functions as a coalescing agent thereby reducing the relative humidity from ranges such as 90–95% to ranges such as 55–65%. It is believed that ozone actually increases the weight of the moisture droplets subjecting them to gravity. In further accordance with the invention, homogeneous ozone also flocculates the dust particles thereby increasing their weight and thus precipitating the solids from the air. The dust carrier for airborne pathogens is thus largely removed from the interior of the barn, and yet does not contribute to the spread of disease. It should be noted that the same flocculation occurs in the "cap" of the pit as described above, thereby resulting in a marked clarification in the treated stratum.

While the preferred embodiments have been disclosed, one of ordinary skill in the art will readily appreciate that the invention is susceptible of modification without departing from the scope of the following claims.

What is claimed is:

1. An ozone injection system for a confined area occupied by humans and/or animals, said confined area comprising air and said injection system comprising:
   one or more perforated conduits extending about the air in the confined area;
   means for recirculating a substantial amount of the air through said one or more perforated conduits; and
   at least one ozone generator fluidly communicating with said one or more perforated conduits,
   wherein said at least one ozone generator supplies ozone in concentrations greater than 0.1 PPM within said one or more perforated conduits, and said one or more perforated conduits distribute ozonated air to the confined area resulting in an average concentration of 0.01 to 0.1 PPM ozone throughout the air.

2. The system of claim 1 wherein said at least one ozone generator is remotely located respective to the confined area, and, said means for recirculating a substantial amount of the air draws ozone to the confined area.

3. An ozone injection system for a confined area comprising air and a manure pit containing a liquid volume, said injection system comprising:
   one or more perforated conduits extending about the air in the confined area;
   means for recirculating a substantial amount of the air through said one or more perforated conduits;
   at least one ozone generator fluidly communicating with said one or more perforated conduits; and
   an ozone dispersal system in fluid communication with said manure pit wherein said dispersal system creates an upper ozonated stratum in said liquid volume and maintains an anaerobic stratum below said ozonated stratum,
   wherein said at least one ozone generator supplies ozone in concentrations greater than 0.1 PPM within said one or more perforated conduits, and said one or more perforated conduits distribute ozonated air to the confined area resulting in an average concentration of 0.01 to 0.1 PPM ozone throughout the air and said at least one ozone generator fluidly communicates with said ozone dispersal system.

4. The system of claim 3 wherein said ozone generator supplies about 0.1 to 1 milligrams of ozone per gallon of liquid treated per day.

5. An ozone injection system for a confined area comprising air and a manure pit containing a liquid volume, said injection system comprising:
   one or more perforated conduits extending about the air in the confined area;
   means for recirculating a substantial amount of the air through said one or more perforated conduits;
   at least one ozone generator fluidly communicating with said one or more perforated conduits,
   wherein said at least one ozone generator supplies ozone in concentrations greater than 0.1 PPM within said one or more perforated conduits, and said one or more perforated conduits distribute ozonated air to the confined area resulting in an average concentration of 0.01 to 0.1 PPM ozone throughout the air;
   a buoyant vehicle within said liquid volume;
   a liquid pump secured to said vehicle for propelling said vehicle across said liquid volume, said pump comprising an inlet port and an outlet port, said outlet port in fluid communication with said inlet port;
   a gas injector in fluid communication with said outlet port, said injector comprising a liquid inlet port, a liquid outlet port in fluid communication with said liquid inlet port, and a gas injection port fluidly communicating with said at least one ozone generator; and
   a propulsion manifold rotatably and fluidly communicating with said liquid outlet port, said propulsion manifold comprising one or more propulsion outlet ports for propelling said vehicle,
   wherein said vehicle is propelled across the pit thereby creating an upper ozonated stratum in said liquid volume and maintaining an anaerobic stratum below said ozonated stratum.

6. The system of claim 5 wherein said vehicle has at least one tapered end.

7. The system of claim 5 further comprising:
   a grated cover extending above said manure pit wherein a gap comprising air exists between said grated cover and said liquid volume; and
   a second set of one or more perforated tubes extending across said gap, wherein said ozone generator fluidly communicates with said second set of one or more perforated tubes extending across said gap thereby further homogeneously distributing ozone throughout the air.

8. An ozone injection system for a confined area comprising air and a manure pit containing a liquid volume, said injection system comprising:
   a first set of one or more perforated tubes extending about the air in the confined area;
   means for recirculating a substantial amount of the air through said first set of one or more perforated tubes;
   a second set of one or more perforated tubes extending within an upper portion of the liquid volume in said pit; and
   at least one ozone generator in fluid communication with said first and second sets of one or more perforated tubes,
   wherein said second set of one or more perforated tubes creates an upper ozonated stratum in said liquid volume, and, said at least one ozone generator supplies ozone in concentrations greater than 0.1 PPM within said first set of one or more perforated tubes, and said first set of one or more perforated tubes distributes ozonated air to the confined area resulting in an average concentration of 0.01 to 0.1 PPM ozone throughout the air.

9. The system of claim 8 further comprising:

a grated cover extending above said manure pit wherein a gap comprising air exists between said grated cover and said liquid volume; and a third set of one or more perforated tubes extending across said gap, wherein said at least one ozone generator fluidly communicates with said third set of one or more perforated tubes extending across said gap thereby further distributing ozone.

10. An ozone injection system for a confined area occupied by humans and/or animals, said confined area comprising air and said injection system comprising:

one or more perforated conduit(s) extending about the air in the confined area;

a chamber in fluid communication with said one or more perforated conduit(s);

means for recirculating the air through said chamber, then through said one or more perforated conduits, and then back into the confined area; and an ozone generator fluidly communicating with said chamber, wherein said ozone generator supplies ozone in concentrations greater than 0.1 PPM within said chamber, and said one or more perforated tubes distribute ozonated air to the confined area resulting in an average concentration of 0.01 to 0.1 PPM ozone throughout the air.

11. The system of claim 10 further comprising an ozone monitor within said chamber wherein said monitor detects an average ozone concentration in the air leaving the chamber.

12. An ozone injection system for a confined area comprising air, said injection system comprising:

a plenum;

means for recirculating the air through said plenum, and then back into the confined area;

an ozone generator fluidly communicating with said plenum for ozonating air therein; and means for homogeneously distributing the ozonated air within the confined area, wherein said ozone generator supplies ozone in concentrations greater than 0.1 PPM within said plenum, and said means for homogeneously distributing ozonated air within the confined area results in an average ozone concentration of 0.01 to 0.1 PPM throughout the air in the confined area.

13. The system of claim 12 further comprising an ozone monitor within said plenum wherein said monitor detects an average ozone concentration in air leaving the plenum.

14. The system of claim 13 further comprising an ultraviolet light within said plenum wherein the ultraviolet light maintains an average ozone concentration of 0.1 PPM or less in the air leaving the plenum when actuated by a signal from said ozone monitor.

15. A method of oxidizing airborne pollutants within a confined area comprising air, the method comprising the steps of:

circulating the air from the confined area into a plenum void of animals and humans;

ozonating the air within the plenum at ozone concentrations in excess of 0.1 PPM;

circulating the air back into the confined area; and maintaining the average ozone concentration within the confined area at 0.1 PPM or less.

16. An ozone injection system for a confined area, said injection system comprising:

one or more perforated conduit(s) extending about the air in the confined area;

a chamber in fluid communication with said one or more perforated conduit(s);

means for recirculating the air through said chamber, then through said one or more perforated conduits, and then back into the confined area;

an ozone generator fluidly communicating with said chamber, an ozone monitor within said chamber for detecting an average ozone concentration in the air leaving the chamber; and an ultraviolet light within said chamber for maintaining an average ozone concentration of 0.01 PPM or less in the air leaving the chamber when actuated by a signal from said ozone monitor, wherein said ozone generator supplies ozone in concentrations greater than 0.1 PPM within said chamber, and said one or more perforated tubes distribute ozonated air to the confined area resulting in an average concentration of 0.01 to 0.1 PPM ozone throughout the air.

* * * * *